May 26, 1970  D. W. GORDON  3,513,491
ATHLETE'S LANDING PIT WITH FOAM-BLOCK CUSHION UNITS
Filed March 13, 1968
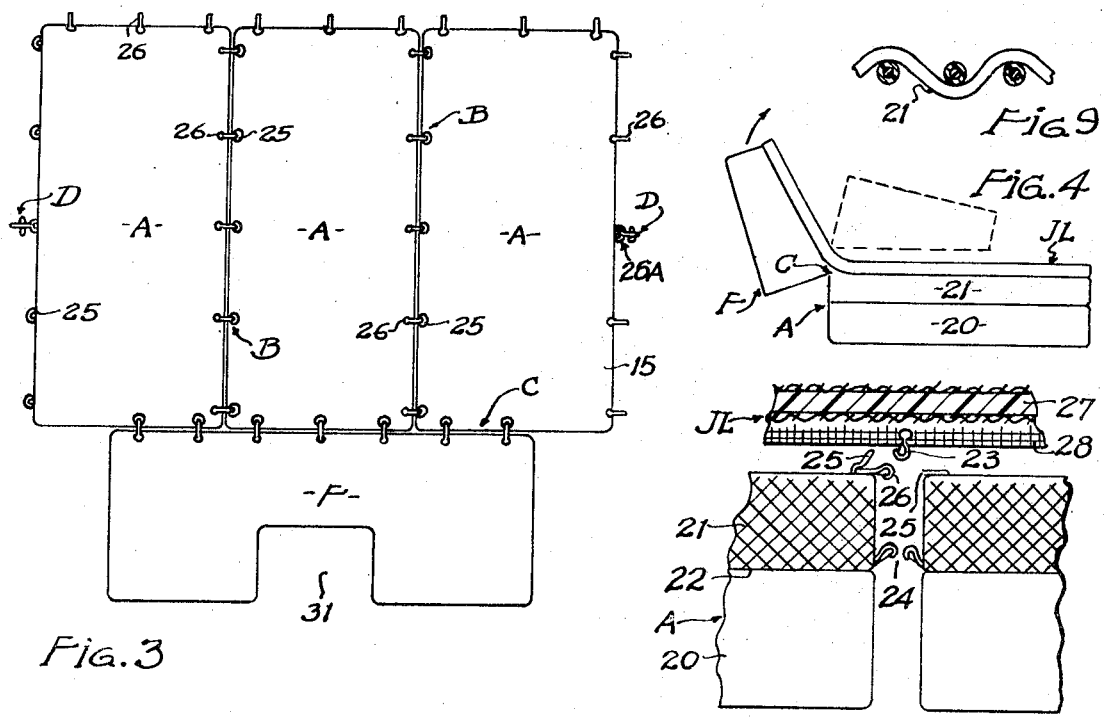
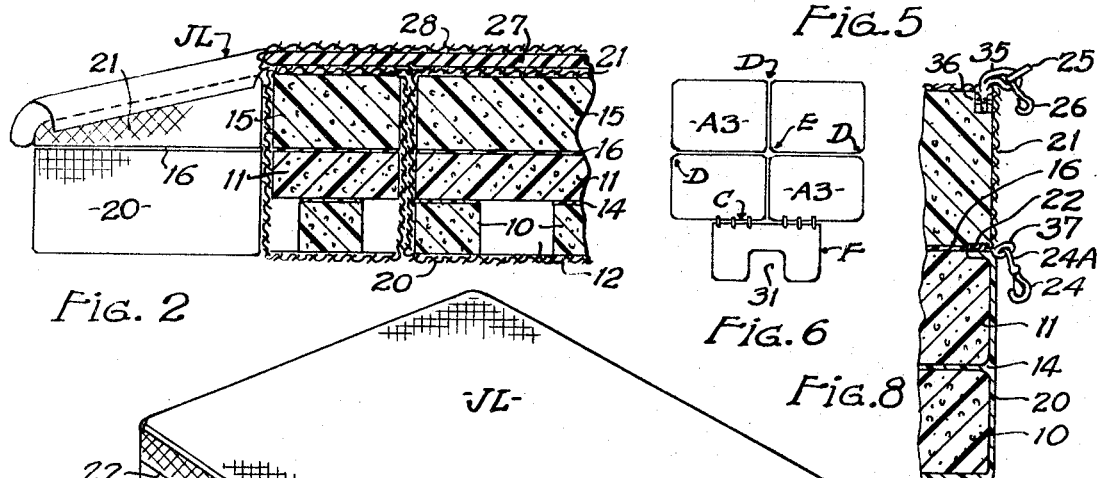
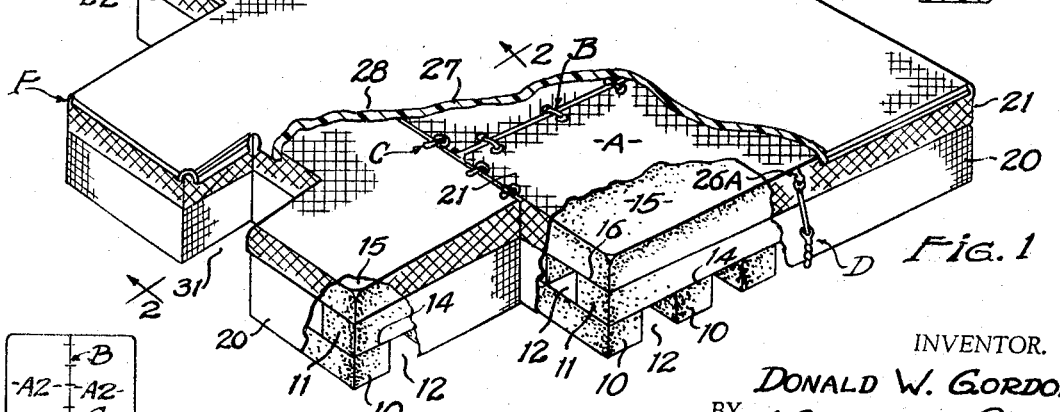
INVENTOR.
DONALD W. GORDON
BY Lynn H. Latta
—ATTORNEY—

United States Patent Office 3,513,491
Patented May 26, 1970

3,513,491
ATHLETE'S LANDING PIT WITH FOAM-BLOCK CUSHION UNITS
Donald W. Gordon, Baldwin Park, Calif.
(P.O. Box C, Temple City, Calif. 91780)
Continuation-in-part of application Ser. No. 566,108, July 18, 1966. This application Mar. 13, 1968, Ser. No. 712,714
Int. Cl. A47c 23/00, 27/00
U.S. Cl. 5—345   13 Claims

ABSTRACT OF THE DISCLOSURE

Disclosed herein is an athlete's landing surface cushion unit wherein a bun of soft foamed cushioning material at the top of the unit is supported upon intermediate and bottom layers of firm cushioning material comprising spaced, parallel foam blocks, the blocks of these two layers extending crosswise of one another and adhesively bonded together at the crossings. The unit is enclosed in a casing having a waterproof base and a top of breather fabric of loose weave of pre-coated strands. A plurality of the units are hooked together to form a pole vaulter's or high jumper's landing pit or for any other purpose that requires the catching of a falling body. The composite pit is covered by a top pad which bridges over the joints between the connected cushion units, protects them from damage from spiked shoes, from atmospheric ultra-violet rays, and from other atmospheric deterioration, and which is replaceable from time to time as it becomes worn or damaged.

RELATED APPLICATION

This application is a continuation-in-part of my application Ser. No. 566,108, filed July 18, 1966, now patent No. 3,391,414 for Athlete's Pneumatic Landing Pit.

BACKGROUND OF INVENTION

Landing pits utilizing plastic foam scrap (e.g. flakes) contained in fabric casings, have been in general use prior to this invention. It has been customary to assemble several such units to collectively provide a pit of ample size for use, for example, by a pole vaulter. My Pat. No. 3,204,259, issued Sept. 7, 1965, discloses such a pit. These units, while excellent, had room for improvement. Some of the problems in using scrap foam as a cushioning filler for my landing encasements are:

(a) The weight of the landing surfaces becomes excessive and makes them difficult to transport and handle.

(b) There is a continuing problem of the scrap foam shifting, bird's nesting and compacting.

(c) The net coverings have never been satisfactory because of their abrasive nature and the fact that they let too much sunlight penetrate the foam, which causes it to turn brown and crumble. This is called frying. The flakes escape and adhere to the athlete and become very annoying and distasteful.

(d) Filling the encasements with scrap rounded the corners and caused valleys when they were joined together. I have solved this by the development of a valley filler unit and an overall top cover unit. The valley-filler unit, however, is not totally satisfactory.

(e) The scrap foam tends to compress and along with bird's nesting, becomes very hard.

It was possible to remedy the above by using prime foam (not scrap, but solid buns). By doing this, two new problems were created.

(a) As air expulsion is a prime requisite for landing surfaces and net has been the only acceptable fabric that could take the punishment of the spiked track shoe; using prime foam was out of the question because.

(1) The open nature of the net allows too much sunlight to penetrate the urethane foam which fries and disintegrates it and (2) The spiked track shoes could penetrate and move horizontally while embedded in the foam, thus ripping it to shreds.

(b) Using solid foam buns did not give the resilient landing surface required by the athlete. In explanation, scrap foam deflects the oncoming energy in all directions while prime foam buns only compress downward and then become relatively unyielding, thus giving an extremely firm landing, which in repeated tests was not satisfactory to the athlete.

With the above problems in mind, two major obstacles had to be solved and accordingly, two major objects of the invention are:

(a) To develop a burlap type fabric that could take the punishment of the spiked track shoe, to prevent the spike from horizontal maceration of the encased prime foam and filter out most of the sun's rays to cut down the above mentioned frying, and (b) To utilize prime foam buns in such a manner that they will give the same or better resiliency than scrap foam and at the same time not bird's nest or become hard, while still offering the advantage of a light square configuration. A perfect box configuration is utilized, which eliminates the need of a special device to fill the valleys formed when using scrap filled encasements. It also makes for a much easier to handle and store as well as a more eye-appealing piece of equipment.

The first problem was tackled when a manufacturer of coated fabrics was retained to make a nylon base vinyl coated breather fabric to my specifications. This was an open-weave nylon which was then coated with vinyl. Although this fabric seemed like the answer at first, after extended use in the field I found it didn't hold up. The vinyl coating wore off too fast and the scrim or base nylon material tended to be torn up by the spiked shoes too fast. The process in the above material was to take the already woven nylon fabric and coat it. This meant the vinyl locked the weave and when one strand was broken it put additional strain on its neighboring strand.

SUMMARY OF INVENTION

The present invention provides a very decided improvement in landing surface performance and durability, and deals with the problems stated above.

(a) By utilizing, for basic construction, a plurality of rectangular cushion units (each small enough to be handled without difficulty); assembling these units in juxtaposition to provide a composite cushioning body of sufficient aggregate area; and utilizing a replaceable top pad of equal aggregate area to cover the assembled units and of sufficient depth to bridge across the joints between the cushion units, minimizing gap pockets, to substantially eliminate spike damage to the cushion units, and to protect the cushion units from the deteriorating effects of the ultra-violet rays of sunlight and other deteriorating factors, yet of sufficient thinness to be handled without difficulty.

(b) The invention minimizes penetration of sunlight into the foam material by utilizing breather material that has better coating properties and where the weave would be loose instead of locked.

(c) Each of the individual cushion units is in itself of composite construction, combining a base section of relatively stiff urethane or equivalent foam material composed of horizontally spaced parts, with a top section of relatively soft foam material in the form of a continuous bun covering and secured to the base section. From these concepts I developed a three-layer cushion unit including a lattice-work arrangement of two layers of stiff foam blocks in the base unit; the blocks being arranged in spaced parallel relation in each of the base layers, the blocks of the intermediate layer being laid across and cemented to the blocks of the lower layer; the continuous bun of the top layer of rectangular form, being cemented to and covering the full aggregate area of the blocks of the base layers; and the three layers being enclosed in a fitted casing of rectangular box form having a base section of water-proof vinyl-coated fabric, substantially air-impervious, and a top section of the improved breather fabric. A plurality of the three-layer units are assembled to provide a composite landing surface which is covered by a top pad comprising a sheet of three inch thick foam encased in a cover of the improved breather fabric.

(d) In addition, the invention provides means for detachably securing the several units together in a unitary landing cushion assembly; and means for anchoring the two sides of the assembly to ground to prevent shifting under landing impact.

(e) A centrally-notched front cushion unit; adapted to surround three sides of a pole-vaulter's plant box, is attached to the assembly of main cushion units by a hinge joint between its upper rear margin and the upper forward margin of the main cushion assembly, whereby the front unit may be folded upwardly and back upon the main cushion assembly to facilitate measuring the height of the cross-bar to be vaulted.

DESCRIPTION

Referring now to the drawings:

FIG. 1 is a perspective view of a pole-vaulter's landing cushion assembly embodying the invention, parts being broken away and shown in section to illustrate internal structure;

FIG. 2 is a cross-sectional view taken on line 2—2 of FIG. 1;

FIG. 3 is a plan view of the assembly of cushion units with the top pad removed, illustrating the fasteners for attaching the units together in assembly, and the ground anchors;

FIG. 4 is a side elevation of the assembly, illustrating how the front unit can be hinged upwardly;

FIG. 5 is an exploded fragmentary front elevational view of the joint between cushion units, illustrating the side fasteners;

FIG. 6 is a schematic plan view of a modified assembly of cushion units;

FIG. 7 is a schematic plan view of another modified assembly;

FIG. 8 is a fragmentary sectional view showing the cushion casing seams and fasteners; and FIG. 9 is a detail of the breather fabric.

As an example of one form in which the invention may be embodied, FIGS. 1–5 disclose an assembly of three main cushion units A, each of rectangular planform, assembled in a rectangular assembly, with inner margins coupled at B by releasable fasteners; a front unit F abutting the two front units A, in centered relation thereto; and a cover pad JL having an area corresponding to the composite area of the four assembled units A and F. Front unit F has its upper rear margin attached at C by releasable fasteners to the upper front margins of main cushion units A. The two sides of the assembly are anchored to ground by auger anchors D, to hold the assembly against shifting under the impact of an athlete's landing.

Each of the units A and F is of three-layer construction, including lower and intermediate base layers composed of elongated blocks 10 and 11 respectively, of relatively firm urethane foam material, in spaced parallel relation in each layer, the blocks 11 bridging across the blocks 10 at right angles. For example the blocks 10 of the lower layer may extend from said to side of the assembly, and in that event the blocks 11 of the intermediate layer extend from front to rear. For a pole vaulter's landing cushion assembly, a satisfactory size for the main rectangular area of assembled cushion units A is ten feet by sixteen feet in plan, and thirty inches in depth, and each unit A may be approximately ten feet by five feet, four inches in area. Blocks 10 and 11 may be about ten inches by eleven inches by five feet. Spaces 12 between the blocks may be about eleven to twelve inches wide, so that the blocks 11 at one end may overhang a block 10 for a distance of about five inches, and the blocks 10 at one end may project beneath and beyond an overlying block 11 about five inches. These five inch spaces may then be matched along the lines of abutment between points B—B so as to collectively provide a space 13 of about the same width as spaces 12. Blocks 10 and 11 are cemented together, at 14, in their areas of crossing.

A top bun 15 of a softer foam material than blocks 10 and 11, covers the base layers, its area being the full area of the cushion unit. The bun 15 is cemented to the upper faces of blocks 11, at 16. The blocks 10 and 11 and bun 15, when secured together provide a cushion core which is enclosed in a casing of rectangular box form composed of a base section 20 of waterproof fabric and a cover section 21 of netting which provides a breathing action, allowing air to be expelled upwardly through the cover section when a cushion unit is compressed under impact of an athlete's body.

The netting material 21 (FIG. 9) comprises warp and woof nylon strands precoated with heavy coatings of vinyl plastic or other suitable durable material, loosely woven (not locked together as they would be if the fabric were coated after being woven). I find that this material is resistant to the tearing action of spikes. Instead of the spiked shoe cutting the strands it tends to push them aside because of the lose weave. When a strand is broken (which is very infrequent) a tear does not develop as no additional pressure is put on the neighboring strands. Also because each strand is individually coated and is coated heavily, the abrasive wear-off of vinyl is almost cut to zero. The base section 20 of the casing is of more closely-woven fabric, coated with vinyl plastic and substantially impervious to moisture. Thus it protects the core from the effects of ground moisture. The margins of the base and cover sections are seamed together in a seam 22 to which fasteners (e.g. snap-hooks) 24 are anchored.

The front cushion unit F may be of construction similar to units A, but provided in its forward side with a central notch 31 which provides open space above the plant box for a pole vaulter's pole.

In assembling the landing surface, the three main units A are joined at B first by attaching heavy lower hooks 24, on one unit at intermediate level, to shank rings 24A of opposed hooks of an adjoining unit, and then by attaching smaller snap hooks 26 at the top level, to grommets or D rings 25. The two sides of the assembly are then anchored to ground by means of the auger stakes D and short lengths of cable which are attached to upper side snaps 26A and to the stakes D.

Overall cover pad JL comprises a sheet 27 of foam plastic, about three inches thick, enclosed in a shallow casing 28 of the loose weave netting fabric described above. The margins of the pad JL hang over the margins of cushion units A and F. Pad JL is secured to units A by suitable fasteners (e.g. snap hooks 23, FIG. 5) hooked into D-rings 25 along joints B and along the entire periphery of the main cushioning area of assembled units A, including the front joint C. Fasteners 23 are anchored to the under surface of pad JL at points adapted to register with the locations of top fasteners 25, 26 of the main assembly A, A, A (FIG. 5). Fasteners 25, 26 may be attached to units A in pairs, i.e., one snap hook 26 and one D-ring 25 anchored by a common anchor loop 35 sewed into an inturned top marginal seam 36 joining the top sheet to the lateral skirt portion of netting casing cover 21. Thus a D-ring 25 may be attached to a snap hook 23 of pad JL while its associated snap-hook 26 is attached to an opposed D-ring 25 of an adjacent unit A. Heavy fasteners 24, 24A can be satisfactorily anchored to casing 20, 21 by means of anchor loops 37 sewed into seams 22 joining the casing sections 20 and 21 to one another.

An important improvement provided by the invention is the upward hinging action of the front section F which is made possible by utilizing the single row of fasteners at C to provide a hinge joint connecting the upper rear margin of unit F to the upper forward margin of the main cushion body A, A, A. Thus when it becomes necessary for officials to use a tapeline and stepladder to measure the height from ground surface to the cross-bar to be vaulted, the front unit can be folded back on the main cushion body as indicated in FIG. 4 so as to clear the ground area for the stepladder.

FIG. 6 discloses another form in which the invention may be embodied, comprising an assembly of four main cushion units A, each of rectangular planform, assembled in a rectangular assembly, with inner corners coupled at E by releasable fasteners; a front unit F; and a cover pad JL. Units A are attached together at their front ends by front unit F, at C, and at their side corners at D.

FIG. 7 illustrates another modification in which two cushion units A2 are coupled at B along their adjoining sides to provide the same area.

I claim:

1. An assembly of cushion units for an athlete's landing surface, each unit comprising:
    a base section of relatively firm resilient foam in the form of spaced blocks;
    means attaching said blocks to one another in spaced relation;
    said cushion units being of elongated rectangular box form arranged side by side;
    and a front unit having its back side adjoining the front of said rectangular units, in centered relation thereto, and having in its front side a notch to provide an open space above a pole valuter's plant box;
    each of said elongated cushion units extending from said front unit to the back of said assembly.

2. An assembly as defined in claim 1, wherein there are three of said units, comprising a central unit and two side units.

3. A plurality of cushion units as defined in claim 1, arranged in abutting relation to collectively provide a cushioning surface of enlarged area;
    and a cover pad comprising a sheet of foam material and a cover of air-pervious netting enclosing said foam sheet, said pad conforming to said enlarged area and protecting said assembled units from the deteriorating effects of ultra-violet rays and the tearing action of an athlete's spikes.

4. An athlete's landing cushion assembly comprising:
    a plurality of cushion units each comprising;
    a base section of relatively firm resilient foam in the form of spaced blocks;
    and means attaching said blocks together in spaced relation;
    said cushion units being of rectangular box form, arranged with corners of four of said units in adjoining relation to one another;
    a pair of snap hooks anchored to two of said adjoining corners and extending diagonally across the junction between said corners, in crossed relation to one another, and grommets attached to the other two of said corners and receiving said snap hooks to tie said four corners together.

5. An athlete's landing cushion assembly comprising a plurality of rectangular cushion units arranged in abutting relation to collectively provide a cushioning surface of enlarged area;
    a front cushion unit having in its front side a notch to provide an open space above a pole vaulter's plant box; and
    means hingedly attaching the upper rear margin of said front unit to the upper forward margin of said cushioning surface for upward and rearward folding of said front unit upon said cushioning surface to clear the ground area immediately in front of said cushioning surface.

6. A cushion assembly as defined in claim 5, wherein said attachment means comprises a row of releasable fasteners.

7. An athlete's landing cushion assembly comprising:
    a plurality of cushion units of rectangular box form arrangement in abutting juxtaposition to define a composite landing surface of enlarged area;
    and a front unit having its back side adjoining the front of said rectangular units, in centered relation thereto, and having in its front side a notch to provide an open space above a pole vaulter's plant box.

8. A cushion unit as defined in claim 7, wherein each unit further includes:
    a top section of relatively soft resilient foam material in the form of a bun covering the full area of said blocks, bridging over the spaces between them, and cemented to said blocks to provide a cushioning core; and
    a casing including a breather section of air-pervious netting, enclosing said core.

9. A landing cushion assembly as defined in claim 7;
    and a cover pad comprising a sheet of foam material and a cover of air-pervious netting enclosing said foam sheet, said pad conforming to said enlarged area and protecting said assembled units from the deteriorating effects of ultra-violet rays and the tearing action of an athlete's spikes.

10. A landing cushion assembly as defined in claim 7;
    and cover means comprising a pad of foam material and a cover of air-pervious netting over said pad, said pad conforming to said enlarged area and protecting said assembled units from the deteriorating effects of ultraviolet rays and the tearing action of an athlete's spikes.

11. A landing cushion assembly as defined in claim 7, wherein there are four of said units arranged with their corners all adjoining at the ecnter of their composite area.

12. A landing cushion assembly as defined in claim 9, wherein said netting is of loosely-woven nylon strands having individual heavy coatings of tough, wear-resistant plastic material, free of any bonds between the strands or their coatings at the points of crossing of the strands.

13. A landing cushion assembly as defined in claim 9, wherein said cover pad is approximately three inches thick.

References Cited

UNITED STATES PATENTS

| | | | |
|---|---|---|---|
| 2,029,370 | 2/1936 | Heldenbrand | 5—345 XR |
| 2,216,991 | 10/1940 | Trovillo | 5—352 |
| 2,547,840 | 4/1951 | Smith | 5—352 |
| 2,862,214 | 12/1958 | Thompson | 5—361 |
| 3,204,259 | 9/1965 | Gordon | 5—361 XR |
| 3,369,808 | 2/1969 | Sconce | 182—137 XR |

BOBBY R. GAY, Primary Examiner

A. M. CALVERT, Assistant Examiner

U.S. Cl. X.R.

5—357; 182—137